United States Patent [19]
Gennaro et al.

[11] Patent Number: 5,742,768
[45] Date of Patent: Apr. 21, 1998

[54] SYSTEM AND METHOD FOR PROVIDING AND DISPLAYING A WEB PAGE HAVING AN EMBEDDED MENU

[75] Inventors: Giuseppe Gennaro, Cupertino; Jake McGowan, San Jose; Anne P. Wagner, Menlo Park; Kinney Wong, San Jose; Benjamin A. Zamora, Stanford, all of Calif.

[73] Assignee: Silicon Graphics, Inc., Mountain View, Calif.

[21] Appl. No.: 680,836

[22] Filed: Jul. 16, 1996

[51] Int. Cl.$^6$ .................................................. G06F 13/00
[52] U.S. Cl. ................................................... 295/200.33
[58] Field of Search ................. 364/DIG. 1, DIG. 2; 395/761, 762, 326, 352, 353, 354, 355, 356, 357, 358, 200.47, 200.48, 20.33

[56] References Cited

U.S. PATENT DOCUMENTS 5,572,643  11/1996  Judson .................. 395/200.48

OTHER PUBLICATIONS

John C. Dhabolt "Re: Help with Menus" http://dejanews.com (Jun. 13, 1996) p. 1.

*Primary Examiner*—Robert B. Harrell
*Attorney, Agent, or Firm*—Baker & Botts, L.L.P.

[57] ABSTRACT

A method for providing a web page (26) having an embedded menu (46) to a web browser (24) and for displaying the web page (40) to a user of the web browser (24) are provided. A request for a web page (20) is received from a web browser (24). In response to the request, a web page (26) and an applet (28) associated with the web page (20) are packaged for transmission to the web browser (24). The web page (26) and the applet (28) are then transmitted to and downloaded by the web browser (24). When the web page (26) is displayed and the applet (28) is executed by the web browser (24), the applet (28) creates and manages an embedded menu (46) in the displayed web page (40) under control of the applet (28). This embedded menu (46) provides a user of the web browser (24) with a plurality of links (48) through one action in the displayed web page (40).

20 Claims, 3 Drawing Sheets

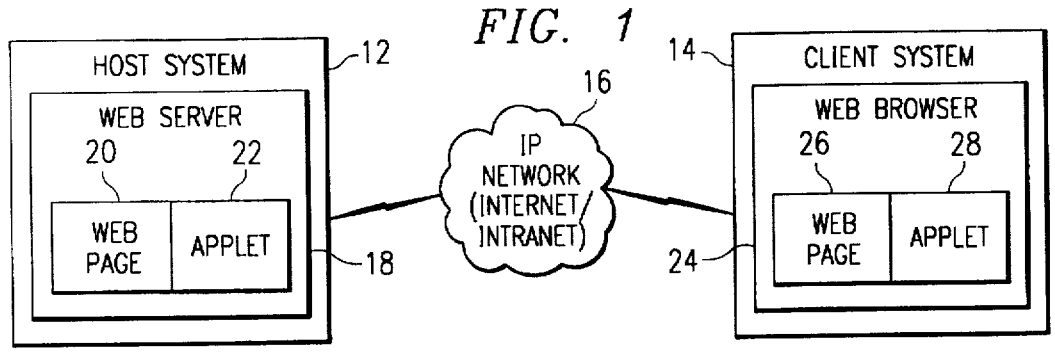
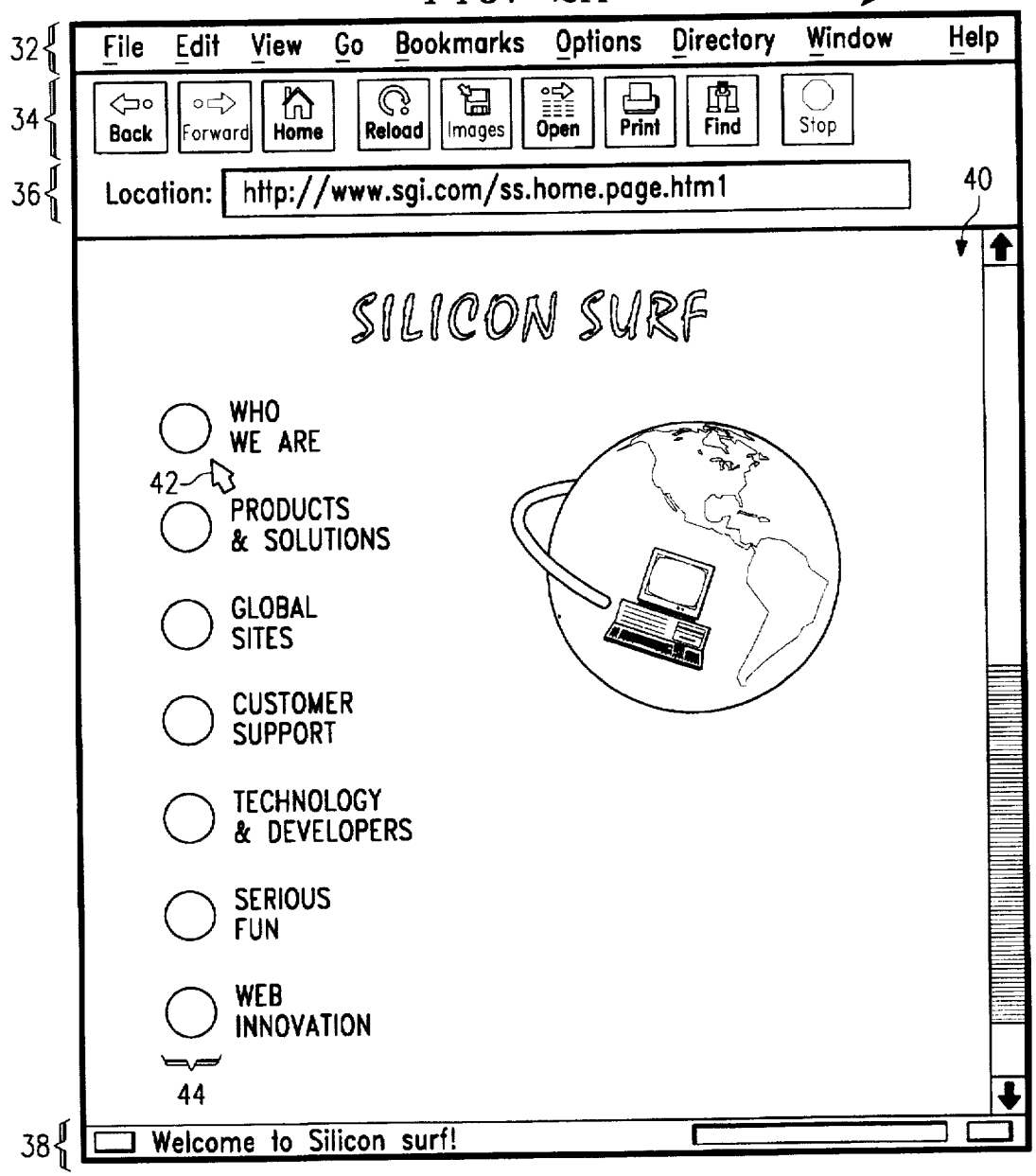

SYSTEM AND METHOD FOR PROVIDING AND DISPLAYING A WEB PAGE HAVING AN EMBEDDED MENU

TECHNICAL FIELD OF THE INVENTION

This invention relates in general to the field of electronic systems, and more particularly to a system and method for providing and displaying a web page having an embedded menu.

BACKGROUND OF THE INVENTION

Web servers and web browsers operating across an IP (internet protocol) network are widely used to provide remote access to information stored on a host system. The public Internet and private intranets are examples of such IP networks and use a communication protocol referred to as the hyper-text transfer protocol (HTTP). The information is commonly packaged as multiple web pages created using a hyper-text markup language (HTML) which can be interpreted by a web browser to generate the display to the user.

In general, URLs (uniform resource locators) are used to identify web pages located on web servers operating on the network. A user of a web browser can request a web page by entering the appropriate URL into the web browser. A request for the selected web page is then transmitted to the web server across the network. The web server receives the request and then packages and transmits the web page back to the web browser for display to the user.

The interaction between web servers and web browsers across the IP network provides a relatively easy and increasingly popular means for accessing remote information. However, the process of navigating through this information in conventional web pages is a linear process. Web pages provide links that correspond one-to-one with other web pages and resources. Thus, one action inside the web page (e.g., a mouse click) can initiate one link to another web page.

One of the means for enhancing a web page is the use of an executable program attached to web page which is downloaded to and executed by the web browser along with the associated web page. These executable programs are commonly referred to as applets and are constructed from a programming language which is executable by the web browser. Once executed by the web browser, the applet provides programmed functionality. For example, the JAVA programming language established by SUN MICROSYSTEMS provides a means for creating JAVA applets which can be attached to web pages to provide enhanced functionality for the displayed web page. One example of a function created by applets is animating an image to produce moving objects on the web page. Applets have also been used to create executable spots in a web page such that graphics on that spot animate when a mouse pointer is moved over the targeted area. An additional function created by applets is to generate and display a separate window on top of a web page in response to a mouse click inside the web page. Such a window can provide a menu bar across the top of the window and provide user options within that window, but it is not within the web page itself. There are, of course, a number of other functions that can be implemented using applets in association with web pages. However, conventional web pages and applets have not altered the linear navigation process.

SUMMARY OF THE INVENTION

In accordance with the present invention, a system and method for providing and displaying a web page having an embedded menu are provided which substantially eliminate or reduce disadvantages and problems associated with previously developed web pages.

According to one aspect of the present invention, a method for providing a web page having an embedded menu to a web browser is provided. This method includes receiving a request for a web page from a web browser. In response to the request, a web page and an applet associated with the web page are packaged for transmission to the web browser. The web page and the applet are then transmitted to the web browser. The applet is operable to create and manage an embedded menu in the displayed web page when the web page is displayed and the applet is executed by the web browser. This embedded menu provides a user of the web browser with a plurality of links through one action in the displayed web page.

According to another aspect of the present invention, a method for displaying a web page having an embedded menu to a user of a web browser is provided. This method includes downloading a web page and an applet from a web server. The web page is then displayed to a user of the web browser, and the applet is executed by the web browser. An embedded menu is created and managed in the displayed web page under control of the applet. This embedded menu provides a user of the web browser with a plurality of links through one action in the displayed web page.

According to a further aspect of the present invention, a host system for providing and a client system for displaying a web page having an embedded menu are provided. The host system includes a data storage device, a memory and a processor and executes a web server for packaging and transmitting the web page and applet. The client system includes a display, a memory and a processor and executes a web browser for downloading the web page and the applet and for displaying the web page and executing the applet. The applets enhance the web page to have an embedded menu that provides a plurality of links through one action in the displayed web page.

Embedding a menu in a web page to allow a user of a web browser to access multiple links through one action in the web page is a technical advantage of the present invention. The web page is enhanced through the use of an applet which creates and manages the embedded menu. A web page having an embedded menu according to the present invention provides an easier and more efficient way to access information from that web page, thus increasing the quality of the web page. In one implementation, the web page has one or more hot spots. When a pointer is positioned over one of these hot spots, a corresponding embedded menu is displayed to provide links to multiple additional web pages. A user can then select a link by positioning the pointer over one of the links and initiating an action such as by clicking a mouse button.

Another technical advantage of the embedded menus of the present invention is the ability to allow a user of a web browser to scan the information content of a web site from an initial displayed web page without linking to new web pages. A user can reposition a pointer over each hot spot to invoke each embedded menu and be provided with multiple links at one or more levels within the web site. For example, an operator of a web server can create a web site for which the initial web page can display, through the use of embedded menus, the overall structure of the web site as well as links to numerous location therein. A user of the web browser can thereby identify and link to desired information more quickly and easily than possible with conventional linear links.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein:

FIG. 1 is a block diagram of a web server and a web browser in an IP network;

FIGS. 2A and 2B illustrate an embedded menu in a web page according to the teachings of the present invention;

DETAILED DESCRIPTION OF THE INVENTION

Figure 2B:
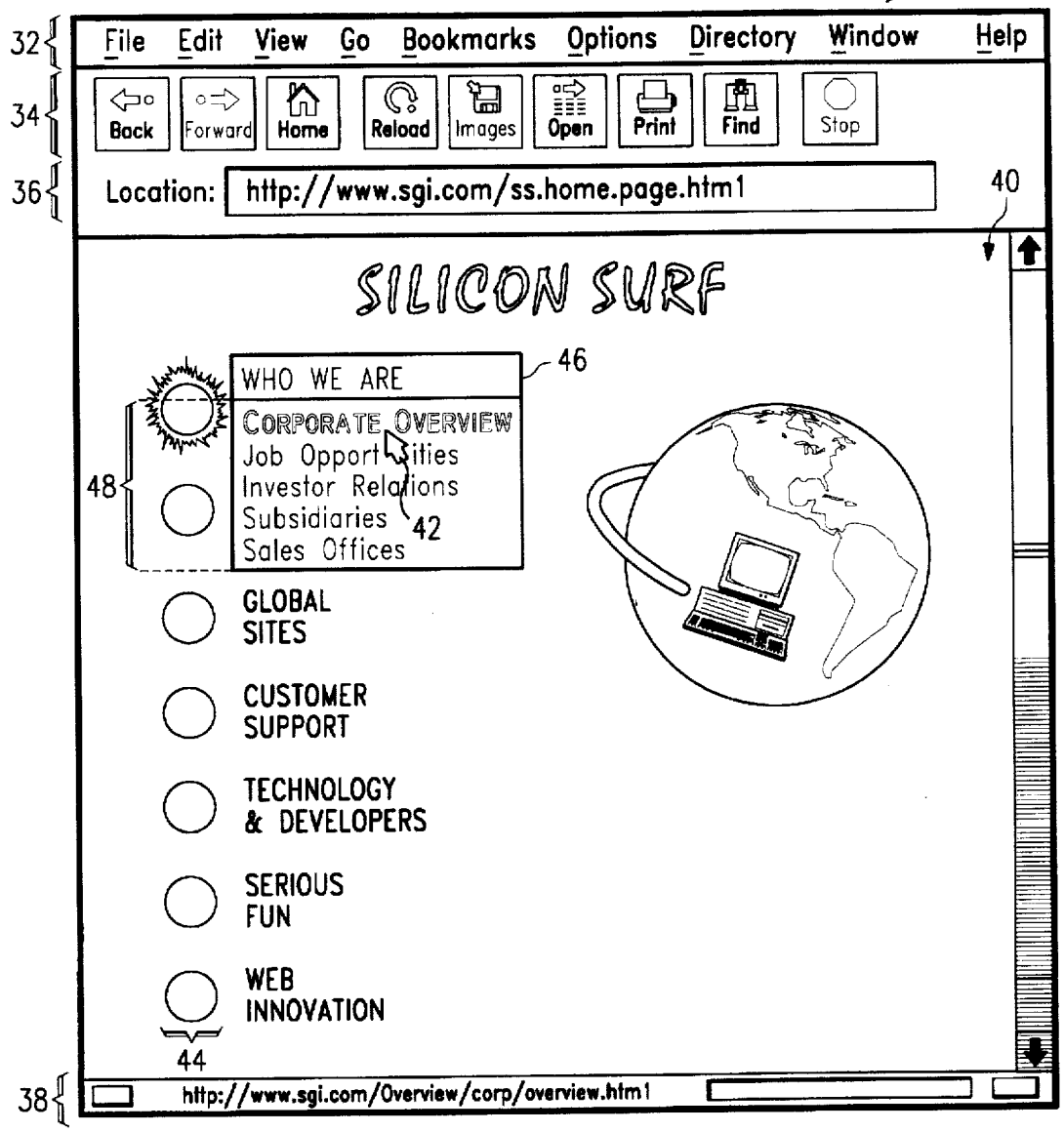

FIG. 1 is a block diagram of a web server 12 and a web browser 14 in an IP (internet protocol) network 16. IP network 16 can be, for example, the public Internet or a private intranet, and host system 12 and client system 14 can communicate across IP network 16 using a hyper-text transfer protocol (HTTP).

Host system 12 and client system 14 can be, for example, a personal computer or computer workstation, and generally include a data storage device, a memory device, a processor and a display. The memory device in host system 12 can store code for and the processor can execute a web server 18. The data storage device in host system 12 can store a web page 20 and an associated applet 22. Web page 20 can be written in the hyper-text mark-up language (HTML), and applet 22 can be written in an interpretive language such as JAVA. Analogous to host system 12, the memory device in client system 14 can store code for and the processor can execute a web browser 24. The memory device in client system 14 can store a downloaded web page 26 and an associated applet 28. Web browser 24 is an applet-capable web browser and can both display web page 26 and execute applet 28.

In operation, a user of client system 14 can use web browser 24 in order to transmit a request for web page 20 across IP network 16. The request can be, for example, a URL (uniform resource locator) for web page 20. Web server 18 can receive the request from web browser 24 and, in response, can package and transmit web page 26 and applet 28 to web browser 24 across IP network 16. Web server 18 packages web page 26 and applet 28 based upon web page 20 and applet 22 stored on host system 12. After downloading web page 26 and applet 28, web browser 24 can display web page 26 to a user of client system 14 and can execute applet 28. Applet 28 only needs to be downloaded once and is executed by web browser 24. When a link is selected in web page 26, web server 18 is sent a request across IP network 16 and can transmit the selected page.

The execution of applet 28 by web browser 24 can provide enhanced functionality to web page 26. According to the teachings of the present invention, applet 28 creates and manages one or more embedded menus in the displayed web page 26. Each embedded menu provides a user of web browser 24 with a plurality of links through one action in the displayed web page 26.

FIGS. 2A and 2B illustrate an embedded menu in a web page according to the teachings of the present invention. As shown in FIG. 2A, a display window generated by web browser 24, indicated generally at 30, can include a menu bar 32 and a plurality of buttons 34 each providing one of various functions for a user of web browser 24. Display window 30 also includes a location field 36 which serves a dual function of indicating the URL of the current location and of allowing a user to enter a new destination URL. In the illustrated example, web browser 24 is being used to navigate the public Internet, and the URL shown in location field 36 is the URL of a web page on the world wide web. Display window 30 further includes a status bar 38 that provides information about the operation of web browser 24. The items in menu bar 32 and buttons 34 and the general layout of display window 30 as shown in FIG. 2A are common features of the NETSCAPE NAVIGATOR web browser available from NETSCAPE COMMUNICATIONS.

Display window 30 includes a displayed web page, indicated generally at 40, which is generated by web browser 24 from the downloaded web page 26 and associated applet 28. Displayed web page 40 provides the user of web browser 24 with the information content accessed from web server 18. The user generally interacts with display window 30 and displayed web page 40 using a pointer device (e.g., a mouse) which controls the position of a pointer 42 and allows a user to initiate actions (e.g., through a mouse click). According to the teachings of the present invention, displayed web page 40 includes a plurality of hot spots 44 that provide access to embedded menus created and managed by applet 28. The embedded menus can be accessed by positioning pointer 42 over one of hot spots 44.

FIG. 2B shows an embedded menu 46 in displayed web page 40 which has been invoked by positioning of pointer 42 over the upper hot spot 44. In the illustrated example, selection of the upper hot spot 44 is indicated by highlighting that hot spot 44 with a halo, as shown. Embedded menu 46 includes a banner that matches the text ("WHO WE ARE") that was associated with the selected hot spot 44 in FIG. 2A. Embedded menu 46 also includes a number of links 48, each providing a link to another web page or resource. The links 48 provided by embedded menu 46 may or may not be URLs directly accessible without initially passing through the initial displayed web page 40.

In FIG. 2B, the "Corporate Overview" link is selected by the positioning of pointer 42 over that portion of embedded menu 46, and status bar 40 reflects the URL associated with the "Corporate Overview" link. If desired, the user of web browser 24 can link to the "Corporate Overview" information by initiating an action, for example by clicking a mouse button, while pointer 42 is in this position. The user could also move pointer 42 elsewhere in embedded menu 46 to select and initiate one of the other links. In other embodiments, embedded menu 46 can have multiple levels of menus accessible through initial menu options.

When pointer 42 is moved outside of embedded menu 46, embedded menu 46 will be removed and displayed web page 40 will again look as shown in FIG. 2A. The user can move pointer 42 over any of hot spots 44 and invoke an associated embedded menu, each of which would provide multiple links to other web pages or resources.

Another technical advantage of the embedded menus of the present invention is the ability to allow a user of web browser 24 to scan the information content that can be linked from an initial displayed web page 40 without linking to new web pages. A user can reposition pointer 42 over each hot spot 44 and be provided with link options within a web site at one or more levels. For example, an operator of web server 18 can create a web site for which the initial web page can display, through the use of embedded menus, the overall structure of the web site as well as links to a number of locations therein. A user of web browser 24 can thereby identify and link to desired information more quickly and easily than possible with conventional linear links.

Figure 3A:
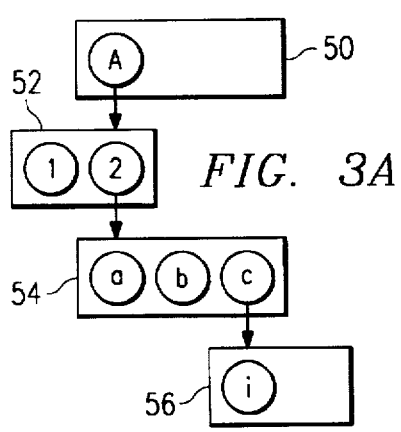
FIGS. 3A and 3B illustrate a comparison between one-to-one and multiple-to-one correspondence between links and actions in a web page.
Figure 3B:
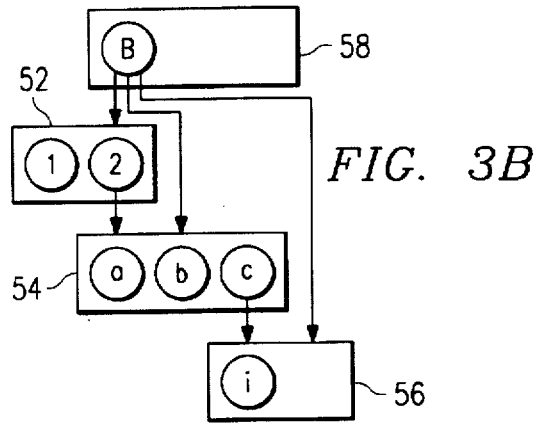

FIGS. 3A and 3B illustrate a comparison between one-to-one and multiple-to-one correspondence between links and actions in a web page. In FIG. 3A, web page 50 includes conventional links which correspond on a one-to-one basis with actions in web page 50. For example, link "A" points to web page 52, and a user can initiate a link to web page 52 from web page 50 by positioning a mouse pointer on link "A" and clicking the mouse button. Similarly, link "2" in web page 52 points to a web page 54, and link "c" in web page 54 points to a web page 56. Link "1" in web page 52, links "a" and "b" in web page 54 and link "i" in web page 56 point to other web pages, which are not shown. In order to navigate web pages 52, 54 and 56 from a starting point of web page 50, a user is required to travel linearly through links "B", "c" and "i" in web pages 50, 52 and 54. This linear navigation requires the user to wait as each link is processed. If using conventional links, an operator of web page 50 would need to add two links to web page 50 in order to allow a user to initiate a direct link to all three web pages 52, 54 and 56. The user is still only able to access one link for each action in web page 50.

Web page 58 of FIG. 3B has an embedded menu according to the teachings of the present invention that provides multiple-to-one correspondence between links and actions in web page 58. Web page 58 provides a user with a much easier and more efficient access to web pages 52, 54 and 56. Web page 52 has an associated applet that creates and manages an embedded menu accessible through hot spot "B". When the embedded menu is invoked, the embedded menu provides the user with links to web pages 52, 54, and 56. Through one action in web page 58, the user can access all three links. This allows the user to more quickly and easily navigate web pages 58, 52, 54 and 56. For example, the user does not have to wait for multiple links to be processed in order to reach web page 56 as is required for the linear links described above.

Figure 4:
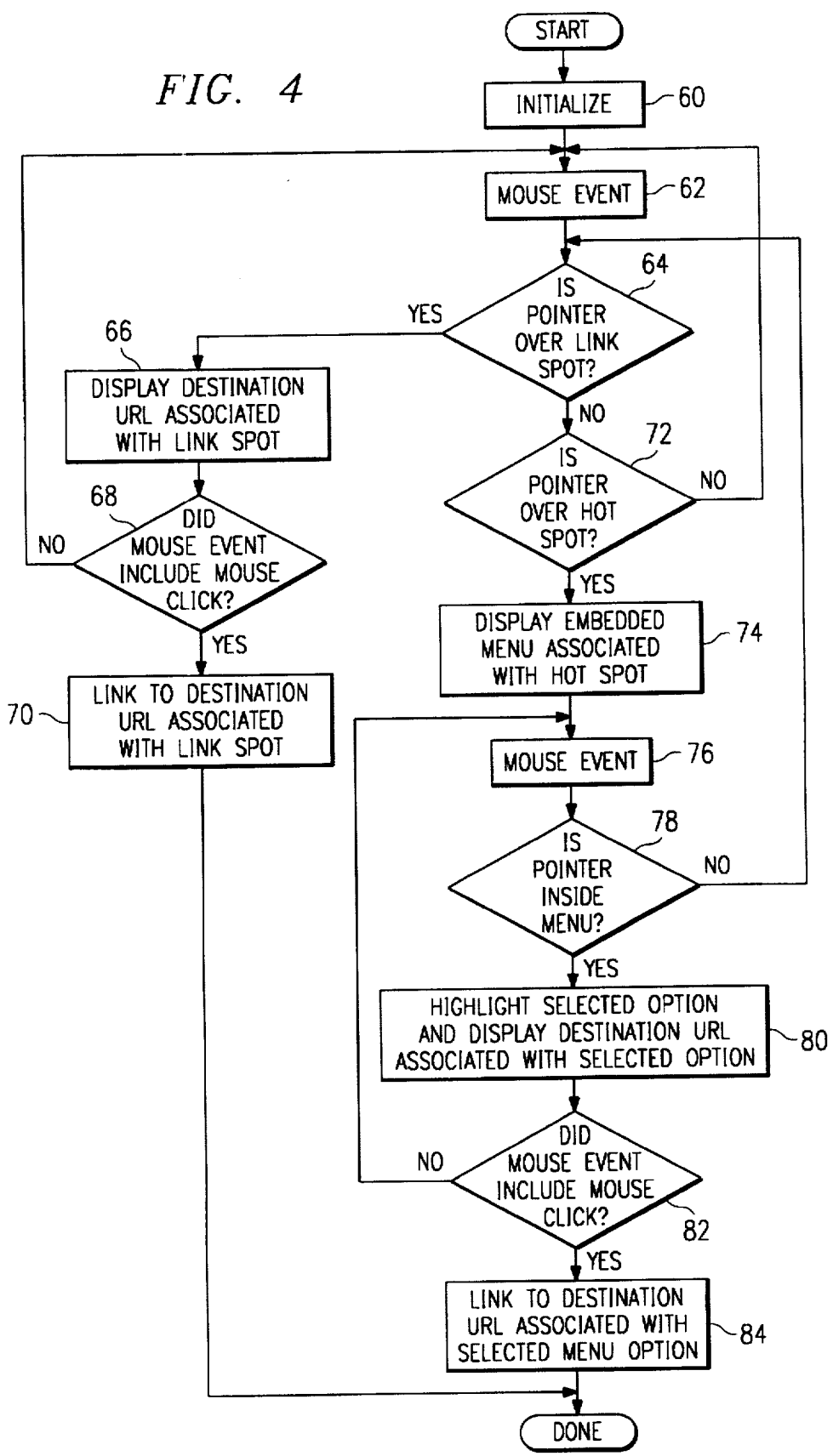
FIG. 4 is a flow chart of a process for managing links and embedded menus in a web page.

FIG. 4 is a flow chart of a process for managing link spots and hot spots in a web page according to the teachings of the present invention. With respect to this process, the term "link spots" is used to refer to conventional one-to-one links within a web page. In general, this process is performed by an applet executed by a web browser in along with the display of an associated web page.

In step 60, the web page and applet are initialized such that they are displayed and executed by the web browser. In step 62, the web browser recognizes a mouse event initiated by a user of the web browser. In step 64, the applet checks whether the mouse pointer is over a link spot in the web page. If so, in step 66, the applet displays the destination URL associated with that link spot. In step 68, the applet checks whether the mouse event included a mouse click. If so, in step 70, the applet initiates a link through the web browser to the destination URL associated with the link spot. At this point, a new web page associated with the destination URL will be loaded which may or may not have an associated applet. If no mouse click occurred, the applet follows step 68 by returning to step 62 and obtaining information about the next mouse event.

If, in step 64, the mouse pointer is not over a link spot, then, in step 72, the applet determines whether the mouse pointer is over a hot spot. If not, the applet returns to step 62 and waits for information about the next mouse event. If the mouse pointer is over a hot spot, then, in step 74, the applet displays the embedded menu associated with that hot spot.

After displaying the embedded menu, the applet waits, in step 78, for information about the next mouse event. If the mouse pointer moves outside of the embedded menu, the applet returns to step 64. If the mouse pointer remains inside the embedded menu, then, in step 80, the applet highlights the selected link within the embedded menu and displays the destination URL associated with the selected link. In step 82, the applet determines whether the mouse event included a mouse click. If not, the applet returns to step 76 to obtain information about the next mouse event. If the mouse event did include a mouse click, then, in step 84, the applet initiates a link to the destination URL associated with the selected menu link. At this point, a new web page associated with the destination URL will be loaded by the web browser which may or may not have an associated applet.

One implementation of an applet according to the teachings of the present invention uses the JAVA programming language established by SUN MICROSYSTEMS. The JAVA programming language provides features to allow frame and window classes to be defined where the frame class provides a separate window created and displayed on top of the web page, and the window class provides an ability to have a menu bar across the top of that separate window. However, the JAVA language does not contemplate embedding a menu in a web page to provide multiple links from one action in the web page. In order to create such an embedded menu using a JAVA applet, the present invention defines a new JAVA class which implements the embedded menu.

The following TABLE provides an outline of the JAVA applet and new class of this implementation of the present invention.

TABLE

Applet and Embedded Menu Class

APPLET
Import Java elements
Import Embedded Menu Class
Define variables
Define defaults for embedded menus
(Main loop)
Obtain hot spots and images, overwriting defaults of they exist
Load default menu parameters
Obtain embedded menu for each hot spot
Define default links
Obtain additional links
Draw and cache images
Reset flag for mouse click
Check whether mouse click inside embedded menu or on link spot
EMBEDDED MENU CLASS
Import Java elements
Define variables
Construct menus
   Set menu colors
   Set menu title
Highlight appropriate menu item
Draw embedded menus, items and border Although the present invention has been described in detail, it should be understood that various changes, substitutions and alterations can be made hereto without departing from the spirit and scope of the invention as defined by the appended claims.

What is claimed is:

1. A method for providing a web page having an embedded menu to a web browser, the method comprising:

receiving a request for a web page from a web browser;

packaging the web page and an applet associated with the web page for transmission to the web browser; and transmitting the web page and the applet to the web browser;

wherein the applet is operable to create and manage an embedded menu in a displayed web page when the web page is displayed and the applet is executed by the web browser, the embedded menu providing a user of the web browser with a plurality of links through one action in the displayed web page.

2. The method of claim 1, wherein packaging the applet comprises packaging an applet that creates and manages a pop-up menu.

3. The method of claim 2, wherein the applet creates and manages a pop-up menu that is invoked by positioning a pointer over a hot spot in the displayed web page.

4. The method of claim 2, wherein the applet creates and manages a pop-up menu which has a plurality of menu levels.

5. The method of claim 1, wherein receiving a request comprises receiving a request across the public Internet.

6. The method of claim 1, wherein receiving a request comprises receiving a request across a private intranet.

7. The method of claim 1, wherein packaging the applet comprises a JAVA applet having a definition for an embedded menu class.

8. The method of claim 1, wherein the request for the web page is received across a private intranet.

9. A method for displaying a web page having an embedded menu to a user of a web browser, the method comprising:

downloading a web page and an applet transmitted by a web server;

displaying the web page to a user of the web browser; and executing the applet, the applet creating and managing an embedded menu in the displayed web page under control of the applet, the embedded menu providing a user of the web browser with a plurality of links through one action in the displayed web page.

10. The method of claim 9, wherein creating and managing the embedded menu comprises creating and managing a pop-up menu.

11. The method of claim 10, wherein creating and managing the embedded menu comprises creating and managing a pop-up menu which is invoked by positioning a pointer over a hot spot in the displayed web page.

12. The method of claim 10, wherein creating and managing the embedded menu comprises creating and managing a pop-up menu which has a plurality of menu levels.

13. The method of claim 9, wherein downloading a web page and an applet comprises downloading the web page and the applet across the public Internet.

14. The method of claim 9, wherein downloading a web page and an applet comprises downloading the web page and the applet across a private intranet.

15. The method of claim 9, wherein downloading the applet comprises downloading a JAVA applet having a definition for an embedded menu class.

16. A host system executing a web server to provide a web page having an embedded menu to a web browser, the host system comprising:

a data storage device storing a web page and an associated applet;

wherein the associated applet, when executed, can create and manage an embedded menu in a displayed web page;

a memory device storing code for the web server; and a processor coupled to the data storage device and to the memory device, the processor executing code for the web server such that the web server is operable to:

receive a request for the web page from a web browser;

package the web page and the applet for transmission to the web server; and transmit the web page and the applet to the web browser;

such that the applet creates and manages an embedded menu in the displayed web page when the web page is displayed and the applet is executed by the web browser, the embedded menu providing a user of the web browser with a plurality of links through one action in the displayed web page.

17. The host system of claim 16, wherein the embedded menu is a pop-up menu.

18. The host system of claim 17, wherein the pop-up menu is invoked by positioning a pointer over a hot spot in the displayed web page.

19. The host system of claim 16, wherein the pop-up menu has a plurality of menu levels.

20. The host system of claim 16, wherein the request for the web page is received across the public Internet.

\* \* \* \* \*

UNITED STATES PATENT AND TRADEMARK OFFICE
CERTIFICATE OF CORRECTION

| | | |
|---|---|---|
| PATENT NO. | : 5,742,768 | Page 1 of 1 |
| APPLICATION NO. | : 08/680836 | |
| DATED | : April 21, 1998 | |
| INVENTOR(S) | : Giuseppe Gennaro et al. | |

It is certified that error appears in the above-identified patent and that said Letters Patent is hereby corrected as shown below:

Title Pg, Item (75), under "Inventors" column 1, lines 1-2, delete "Jake McGowan" and insert -- Jake H. McGowan --, therefor.

In column 8, line 29, in Claim 16, delete "server;" and insert -- browser; --, therefor.

Signed and Sealed this
Nineteenth Day of June, 2012

David J. Kappos
*Director of the United States Patent and Trademark Office*